R. PARKER.
PROCESS OF MAKING RUBBER BALLS.
APPLICATION FILED JUNE 17, 1915.
1,269,848.
Patented June 18, 1918.
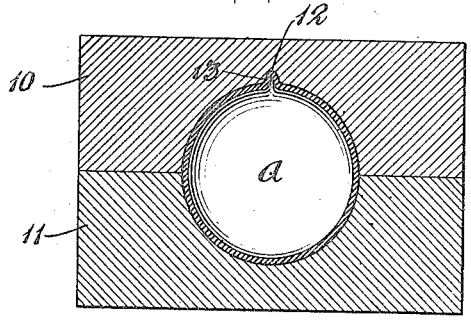
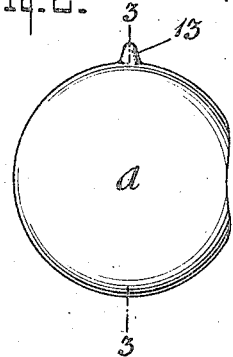
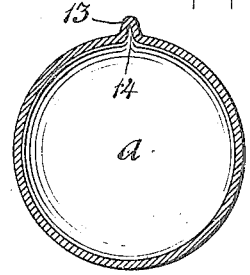
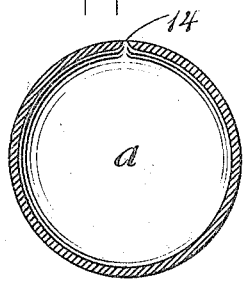
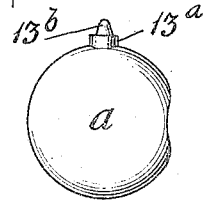
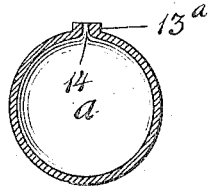
WITNESSES
INVENTOR
RUSSELL PARKER
ATTORNEYS

UNITED STATES PATENT OFFICE.

RUSSELL PARKER, OF BROOKLYN, NEW YORK, ASSIGNOR TO PARKER, STEARNS & CO., OF BROOKLYN, NEW YORK, A CORPORATION OF NEW YORK.

PROCESS OF MAKING RUBBER BALLS.

1,269,848.  Specification of Letters Patent.  Patented June 18, 1918.

Application filed June 17, 1915. Serial No. 34,605.

*To all whom it may concern:*

Be it known that I, RUSSELL PARKER, a citizen of the United States, and resident of the borough of Brooklyn, county of Kings, city and State of New York, have invented certain new and useful Improvements in Processes of Making Rubber Balls, of which the following is a specification.

My invention relates more particularly to hollow rubber balls of the toy variety and to processes for making same and has for its object to improve the product itself and to simplify the manufacture and cheapen the cost of production thereof. Heretofore in manufacturing balls of the kind to which my invention relates it has always been necessary as a final step to cut an aperture therein in order to bring the product to a marketable condition. This proceeding is expensive and because the minimum size of cutting tool capable of being used is fixed, results in a relatively large and unsightly aperture, which owing to the physical characteristics of the material of which the balls are made ofttimes has a ragged appearance even though carefully cut. The principal object of my improvement is to overcome the above objections by avoiding the necessity for separately cutting said apertures and by producing same in a regular uniform manner during the manufacture of the balls and so as to have substantially the smallest possible diameter. My invention will be fully described hereinafter and the features of novelty will be pointed out in the appended claims.

In the accompanying drawings I have shown my improved product and an example of an apparatus whereby the same may be produced, the illustration being of a diagrammatic nature and exaggerated in places to more clearly bring out the invention. In said drawings Figure 1 is a diagrammatic section of a vulcanizing mold adapted to carry out my process with a ball shown in section therein; Fig. 2 is an enlarged exterior view of the ball after it leaves said mold; Fig. 3 is a sectional view thereof on the line 3—3 of Fig. 2; Fig. 4 is a similar view of the finished product; and Figs. 5 and 6 are exterior and sectional views respectively of another form of ball constructed according to my invention.

In manufacturing balls of the type to which my improvement relates sections of uncured rubber or other suitable material are shaped in suitable dies or molds in the usual manner, for instance by air or mold pressure to produce the customary two or more sections of the ball. These sections still in an uncured condition are then joined together by what is technically known as seaming, it being understood that a little water or other expansive material is introduced into the ball at this stage of the process. After the seaming step has been finished the ball is in an irregular or partially collapsed condition. In this irregular condition the ball is placed in the vulcanizing mold in which the heat incidental to the vulcanizing process converts the water in said ball to steam or otherwise expands the material therein and thus expands the ball to its proper shape in said mold. After having been properly vulcanized, the ball is removed from the vulcanizing mold and again resumes its cool condition, thus bringing about a condensation of the steam or a return of the expansible material to an unexpanded condition. To permit the removal of the water or other substance therein, it has heretofore been necessary at this point in the manufacture to cut out a portion of the material to produce an aperture through which said water or other substance may be expelled and air permitted to enter into the ball. Owing to the physical characteristics of the material from which the ball is made, the same cannot be merely punctured as this merely displaces said material as long as the puncturing tool remains in the ball, the material immediately returning and substantially closing the puncture as soon as the tool is removed, but leaving something in the nature of a tear rather than a hole in the rubber fabric. It has therefore been necessary to actually cut out a section of material, a proceeding which adds considerably to the cost of production and to the time necessary to manufacture the finished article. Even though the cutting tool is of the smallest size possible to produce effective results, the aperture is relatively large and unsightly and in spite of the fact that great care is exercised in the cutting operation the aperture is ofttimes ragged in appearance.

With my improved process all of the above objectionable features are removed. Thus in the illustrated example of my improvement, the vulcanizing mold consisting of the customary coöperating sections 10 and 11 is provided in one of said sections with a radially extending recess 12 located at the periphery of the mold and projecting outwardly therefrom as shown in Fig. 1. This recess 12 may be of any size or shape for instance as shown in said Fig. 1. As the uncured ball $a$ is placed in said mold and subjected to the vulcanizing process the same will be expanded as above described by the pressure of the steam or other substance and in addition will cause the material of which the ball is made to enter the recess 12 as shown in Fig. 1. In this manner an external projection 13 is formed on the ball, which projection is fixed by the vulcanizing process and has an internal radial passage 14 communicating with the interior of said ball and extending into the projection 13, but having its outer end closed as illustrated in Figs. 2 and 3. To bring the ball to its finished condition the external projection 13 is simply removed in any suitable manner as by cutting same away close to the outer surface of said ball which now appears as shown in Fig. 4. This may be accomplished in a simple and rapid manner for instance by means of the thumb nail of the operator, the projection 13 being preferably relatively small and easily removable in this manner. The projection 13 may also be readily removed by placing the balls in a tumbler barrel and then operating said barrel, this method of removing the projections also resulting in imparting a fine finish to the article. After the projection 13 has been removed the passage 14 becomes an aperture which establishes communication between the interior of the ball and the atmosphere and through which the water or other substance in the ball may be expelled and air may enter to expand same. With this process the peripheral surface of each aperture will be an absolutely smooth continuation of the inner surface of the ball and the apertures in successive balls will all be uniform and regular and may be made so small according to the thickness of rubber and the size of the recess in the mold as to be almost invisible. At the same time the operation of producing said aperture may be conveniently and rapidly carried out by unskilled operators if desired. It will be seen that in my improved process the passage 14 which finally becomes the aperture is produced coincidentally with the vulcanizing of the product and thus does away entirely with the tedious and expensive cutting operation heretofore used. The ball thus leaves the vulcanizing process as a finished product and as before stated is also considerably improved over balls produced according to present processes.

As shown in Figs. 5 and 6 the exterior projections produced on the ball as described may comprise a neck $13^a$ and a relatively reduced end portion $13^b$, the latter alone being removed to connect the passage 14 which in this case extends through the neck $13^a$, into an aperture. The finished ball in this form will thus include an exterior tubular neck $13^a$ which may be of any dimensions and utilized for any purpose, the type of ball shown in Figs. 5 and 6 being adapted for use for instance in squirt pistols. It will, of course, be understood that the neck $13^a$ and end portion $13^b$ are produced by forming the recess 12 of the vulcanizing mold in a manner to bring about the intended result, rather than by separately attaching such a neck. It will further be apparent that the said recess 12 may be adapted to produce any additional results desired, without in any way changing the process. The finished ball will in any case have a continuously vulcanized inner and outer surface except for the annular space surrounding the mouth of the aperture where the projection has been severed.

My improved process may be utilized for manufacturing other hollow articles of rubber or the like, especially blown rubber products which in their final condition require an aperture to be included therein. The shape of the article which for convenience is referred to as a ball throughout this specification is, of course, determined by the shape of the mold in which it is blown.

Various other changes in the specific form shown and described may be made within the scope of the claims without departing from the spirit of my invention.

I claim:

1. A process for making hollow rubber balls which consists in forcing a portion of the ball outwardly beyond its normal periphery by internal pressure to form a channeled radially extending projection thereon and then removing the projection to expose the channel whereby a radially extending open passage is formed in said ball.

2. A process for making hollow rubber balls which consists in forcing a portion of the ball outwardly beyond its normal periphery by internal pressure during vulcanization thereof whereby a radially extending exterior projection having an internal channel therein is formed, said channel being closed at its outer end and then removing said projection to expose the end of said channel whereby a radially extending open passage is formed in said ball.

3. A process for making hollow rubber balls which consists in forcing a portion of the ball outwardly beyond its normal periphery by internal pressure during vulcanization thereof whereby a radially extending exterior projection having an internal channel therein is formed, said channel being closed at its outer end, removing said projection to expose the end of said channel whereby a radially extending open passage is formed in said ball and coincidentally imparting a finish to said ball.

In testimony whereof I have hereunto set my hand.

RUSSELL PARKER.

Copies of this patent may be obtained for five cents each, by addressing the "Commissioner of Patents, Washington, D. C."